May 8, 1934.                G. H. REID                1,958,314
                           INCLINOMETER
                        Filed July 21, 1933
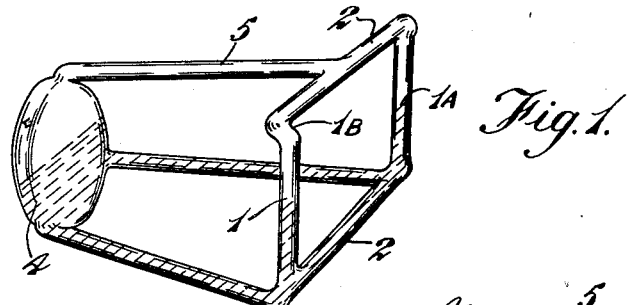
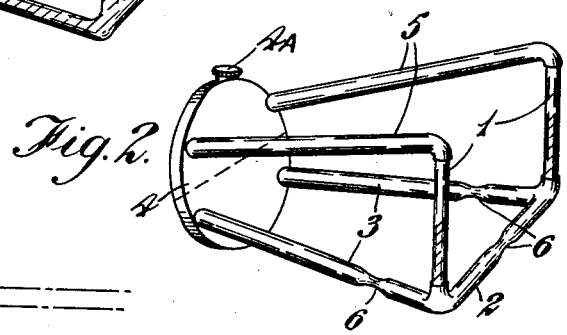
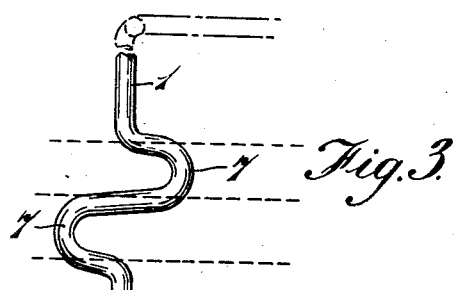
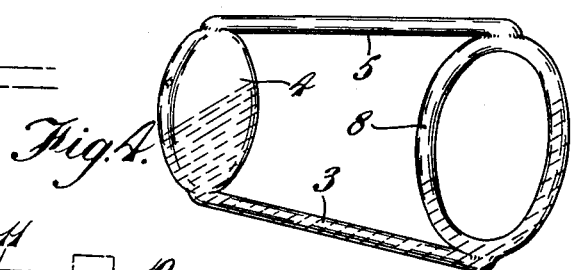
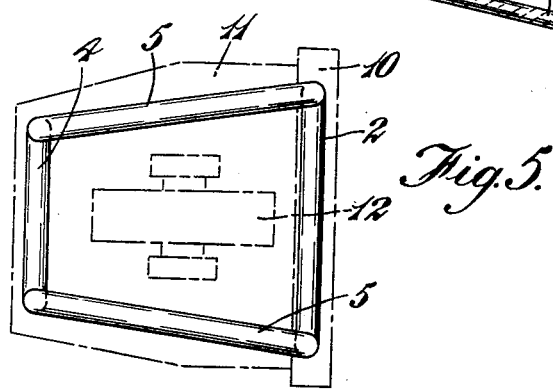
INVENTOR
G.H. Reid
By
Atty Patented May 8, 1934

1,958,314

UNITED STATES PATENT OFFICE 1,958,314

INCLINOMETER

George Hancock Reid, Kingston-on-Thames, England

Application July 21, 1933, Serial No. 681,577
In Great Britain August 9, 1932

2 Claims. (Cl. 33—209)

This invention relates to inclinometers particularly for use in aircraft, and has for its principal object the provision of an inclinometer which will be useful in two axes of inclination, for example in pitch and in roll (where installed in an aircraft), but of course, as will be perceived from the nature of the invention, it has other applications where such advantage can be made use of. A further object of the invention is to provide a liquid level type of inclinometer which may be rendered usefully sensitive or which may be damped to any desired degree, and a further object is to enable an increase of sensitivity to be observed within certain angles or attitudes of operation. Yet another object of the invention is to provide a construction of inclinometer which may conveniently be embodied with other apparatus, particularly a gyroscopic rate of turn indicator or the like, the whole to form a useful instrument as a complete unit.

According to the invention broadly stated, there is provided a U-tube system which is effective in two planes by virtue of being in effect three dimensional. Stated differently, two U-tube systems are arranged to be confluent as to their contents so that there are at least two levels observable, and their positions relatively to each other may give evidence of one required reading, whereas their mutual attitude in relation to a datum may give evidence of another indication. The invention further includes the provision of a liquid level having in effect an exaggerated scale of movement at a predetermined portion of its effective height, whereby sensitivity of reading may be enhanced. Further according to the invention, a liquid level inclinometer particularly adapted to combination with another instrument possibly conveniently correlated, e. g. a gyroscopic turn indicator, is provided. The invention will be better understood by reference to the accompanying diagrammatic drawing, in which:—

Figure 1 is a perspective view of one embodiment;

Figure 2 is a similar view of a modified embodiment;

Figure 3 illustrates a feature applicable to any of the forms of the invention and constituting a part thereof;

Figure 4 represents a further alternative which may be well adapted to certain forms of combined instrument, and Figure 5, which is a plan view, is an example of the embodiment of Figure 1 or 2 within a gyroscopic turn indicator.

In Figure 1 a liquid level inclinometer has two substantially vertical limbs 1 which are intended to be viewed, in which normally the liquid level will be approximately half way up a meniscus being shown at 1A. The tubes 1 are united at top and bottom with cross tubes 2, which may conveniently be formed integrally, the whole device in this case being of glass. From each lower end of the tubes 1 there extends rearwardly a tube 3 which at the rear joins a capsule or chamber 4, in which the liquid level will, in static conditions, be the same as at 1A. From the upper part of the chamber 4 to the upper tube 2 is a further tube 5, normally merely constituting an air tube. In the union of the tubes 1 and 2 there may conveniently be an S-bend or a kink as shown at 1B to facilitate fitting the device into an instrument. It will be perceived if the device be tilted longitudinally, liquid will run through the tubes 3 and the level in tubes 1 will adjust itself to that in chamber 4. The chamber 4 and the tubes 1 therefore virtually comprise limbs of a U-tube, acting as an inclinometer in pitch. If, on the other hand, the device is tilted laterally, liquid will rise in one of the limbs 1 and fall in the other, so that in this case each limb 1 is virtually the limb of an athwartships inclinometer indicating roll. The tube 5 of course allows the necessary displacement of air in the system, and any suitable filling or expansion devices may be applied as may be found necessary.

In Figure 2 similar parts are similarly numbered, but in this case all except the limbs or tubes 1 are of metal, and the upper tube 2 is dispensed with, there being substituted two rearward upper tubes 5. The chamber 4 may have a filling and vent plug 4A sealed or closed in any suitable manner. Use is made of this figure to indicate how the sensitiveness of the device may be damped if required by the constrictions 6 being provided in any or all of the tubes in which liquids flows. Any other suitable damping means, whether adjustable or not, may of course be substituted. In this example operation is precisely as before described.

Figure 3 indicates how the sensitivity of reading of any of the forms of the invention may be enhanced, and shows diagrammatically one limb 1 with the further feature of an S-bend at 7, and disposed so that the whole of it can conveniently be seen by the user between the upper and lower substantially vertical portion of the tube 1. It is intended that the practically horizontal part between the bends 7, shown by the middle dotted line, will be approximately where the liquid level comes to rest in normal conditions. It will be appreciated that a very small departure from this condition will produce an apparently large movement of the liquid, which will not, of course, in fact be a large vertical movement, but only a large linear movement. The upper and lower dotted lines are intended to indicate approximately the zones at which other degrees of sensitivity might be required, for example at the normal climbing and gliding attitudes of the aircraft. This feature of the invention therefore consists in providing for the exaggeration of the apparent movement of the liquid level by elongating the tube in which it flows in a sense other than vertical. It may readily be conceived that the bends can be adapted to particular circumstances so as to enhance or diminish the apparent changes of level for the convenience of the user, and any suitable calibrations alongside the tube may give information corresponding to the effect produced.

Figure 4 shows an adaptation of the two axes liquid level in which some degree of curvature of the viewed limbs is obtained, whilst at the same time the device is readily adaptable to embodiment in an instrument such as a turn indicator. In this case the viewed tube comprises an annular portion 8 connected at its upper and lower points by tubes 5 and 3 respectively to a rearwardly disposed chamber 4. The viewed portion 8, being circular, may conveniently embrace a dial of a turn indicator, or may be of an air speed indicator or other instrument, and instead of being simply circular it may have an exaggerated curvature approximately in the normal position of the liquid level, to obtain a similar effect to that which is explained in connection with Figure 3.

Figure 5 diagrammatically shows a device, for example of the sort shown in Figure 1 or 2, embodied in a gyroscopic instrument the parts of which are shown in broken line and which comprise a face portion at 10, a casing 11, and gyroscopic or other parts as indicated at 12. The actual tubular arrangement is shown as having upper tubes 5, a chamber 4, and a front cross tube 2. It will be seen that the device can be adapted readily to accommodate working parts, and need not occupy any more room than the instrument to which it is to be fitted already takes up.

What I claim is:—

1. A liquid level inclinometer for indicating inclination in two distinct axes, comprising a U-tube having spaced limbs and a third limb spaced from said U-tube and effective in a plane at an angle to that at which the U-tube operates and in confluent connection with the limbs of the U-tube, the limbs of the U-tube having gradations serving to indicate liquid levels in two distinct axes of inclination.

2. A liquid level inclinometer for indicating inclination in two distinct axes, comprising a U-tube having spaced limbs and a third limb spaced from said U-tube and effective in a plane at an angle to that at which the U-tube operates and in confluent connection with the limbs of the U-tube, the limbs of the U-tube having gradations serving to indicate liquid levels in two distinct axes of inclination, one of the limbs of the U-tube being laterally deflected at selected areas to produce an apparently exaggerated movement of liquid level.

GEORGE HANCOCK REID.